Nov. 11, 1969    L. O. LUNDIN ET AL    3,477,339
TRACK-LAYING VEHICLE WHICH MAY VARY IN ELEVATION WHILE
TRACK TENSION REMAINS CONSTANT

Filed April 24, 1968    3 Sheets—Sheet 1

INVENTORS
LARS OLOF LUNDIN
HANS MANNE ALVAR SALOMONSSON
BY
Hane and Baxley
ATTORNEYS Nov. 11, 1969   L. O. LUNDIN ET AL   3,477,339
TRACK-LAYING VEHICLE WHICH MAY VARY IN ELEVATION WHILE
TRACK TENSION REMAINS CONSTANT
Filed April 24, 1968   3 Sheets-Sheet 3

INVENTORS
LARS OLOF LUNDIN
HANS MANNE ALVAR SALOMONSSON
BY
*Harris and Bayley*
ATTORNEYS 3,477,339
Patented Nov. 11, 1969

3,477,339
TRACK-LAYING VEHICLE WHICH MAY VARY IN ELEVATION WHILE TRACK TENSION REMAINS CONSTANT
Lars Olof Lundin and Hans Manne Alvar Salomonsson, Karlskoga, Sweden, assignors to Aktiebolaget Bofors, Bofors, Sweden, a Swedish company
Filed Apr. 24, 1968, Ser. No. 723,839
Claims priority, application Sweden, May 10, 1967, 6,571/67
Int. Cl. F41f 23/08; B62d 55/30
U.S. Cl. 89—40    5 Claims

ABSTRACT OF THE DISCLOSURE

The elevational position of a track-laying vehicle such as a weapon carrier with a gun fixedly mounted thereon is controlled without causing high stresses in the tracks of the vehicle by feeding signals representative of the spatial positions of the support wheels for the tracks relative to the vehicle chassis and manually variable elevational control signals for controlling the elevational position of the vehicle to a comparator which in turn controls the spatial positions of the wheels so as to maintain the stresses in the tracks at acceptable values.

BACKGROUND OF INVENTION

This invention relates to a track-laying vehicle and in particular to a combat vehicle or tank having a weapon stationarily mounted in the chassis of the vehicle so that the laying of the weapon in height, that is the elevation and depression respectively of the weapon, is carried out by variation of the position of the entire vehicle chassis with respect to the ground. A track-laying vehicle of this type is described in the French Patents 1,312,098 and 1,454,812. In this vehicle each of the two tracks runs over two guide wheels stationarily journalled in the chassis and fore and rear support wheels rotatably journalled in pivot levers which are pivoted in the chassis so as to be pivotal in a vertical plane. By variation of the angular positions of these pivot levers with respect to the chassis it is consequently possible to change the attitude of the chassis with reference to the ground, for instance the angle between the longitudinal axis of the chassis and the ground level, which corresponds to a change of the elevation or depression angle of the weapon, or to change the height above the ground of the chassis. In the vehicle described in said patent each pivot lever is coupled to a hydraulic motor consisting of a hydraulic cylinder determining the angular position of the pivot lever with reference to the chassis. On each side of the vehicle the hydraulic cylinder associated with the fore support wheel and the hydraulic cylinder associated with the rear support wheel are connected to opposite sides of a pump having a controlled variable displacement, and furthermore at least one of the hydraulic cylinders on each side of the vehicle is connected to a controlled valve device for supplying and discharging hydraulic fluid respectively to and from the hydraulic cylinders respectively. By means of the two pumps associated with each one side of the vehicle it is consequently possible to transfer hydraulic fluid in either direction between the hydraulic cylinders associated with the rear support wheels and the hydraulic cylinders associated with the fore support wheels and thus to change the elevation angle of the vehicle chassis, that is the angle between the longitudinal axis of the chassis and the ground level. By means of the valve device it is also possible to supply or discharge hydraulic fluid respectively to or from the hydraulic cylinders respectively and thus to change the height above the ground of the chassis. For the control of the elevation and the height-above-ground of the vehicle chassis an electric signal generator is coupled to each pivot lever for generating a signal representing the angular position of the pivot lever with reference to the chassis. For the control of the elevation angle of the vehicle chassis each one of the two controlled variable displacement pumps is constrolled by the difference between a manually variable elevation control signal and the difference between the signals from a signal generator associated with a fore support wheel and a signal generator associated with a rear support wheel. In this way the elevation angle of the vehicle chassis is automatically kept at a value determined by the magnitude of the manually variable elevation control signal and by variation of this elevation control signal it is consequently possible to change the elevation angle of the vehicle chassis. The height-above-ground of the vehicle chassis on the other hand is controlled by means of the valve device supplying and discharging hydraulic fluid respectively to and from the hydraulic cylinders in that the said valve device is controlled by the difference between a height-above-ground reference signal and the sum of the signals from the signal generators associated with all support wheels. In this way the height-above-ground of the vehicle chassis is automatically kept at a constant value determined by the magnitude of the height-above-ground reference signal and by variation of this signal it is consequently possible to change the height-above-ground of the chassis.

A special problem in a vehicle of this type, which has been discussed only superficially in said patents, is due to the obvious fact that upon variation of the elevation of the vehicle chassis the required length of each track will also change, that is the circumference of the tetragon formed by the two guide wheels and the two support wheels on each side of the vehicle will change. If the guide wheels and the support wheels are positioned substantially symmetrically, the circumference of said tetragon and thus the necessary track length will have its minimum value when the vehicle chassis is in a horizontal position, that is has the elevation angle O, and increase for elevation as well as depression of the chassis. In order to avoid unacceptable tensions in the tracks it is necessary to make allowance or compensate for this change of the total track length when the vehicle chassis is being elevated or depressed. The most simple step would be to use tracks having a length corresponding to the maximum track length required for the maximum elevation or depression respectively of the vehicle chassis. However, such a track will obviously become very slack when the vehicle chassis is in its horizontal position. This increases the danger of the de-seating of the tracks and has also an adverse influence upon the driving and steering characteristics of the vehicle and also upon the wear of the tracks and the track wheels. Another possibility would be to journal one guide wheel for each track so as to be resiliently movable with reference to the vehicle chassis. Due to the very large and rapidly varying tensions occurring in the tracks when the vehicle is driven and steered, such a resiliently movable bearing for a guide wheel of the track will be affected by very large forces and stresses.

SUMMARY OF THE INVENTION

The object of the invention is therefore to provide in a tracking laying vehicle of the type described above a control system for controlling the movements of the support wheels of the tracks in such a way that the variation of the required track length caused by changes of the elevation of the vehicle chassis is automatically compensated so that the necessary track length and thus the tension in the track remains substantially constant and unaffected by variation of the elevation angle of the vehicle chassis.

The invention is based on the concept that the necessary track length is dependent of and changes with the elevation angle of the vehicle chassis but is also dependent of and varying with the height-above-ground of the vehicle chassis, wherefore it should be possible to maintain the track length constant upon variation of the elevation angle of the vehicle chassis by varying simultaneously also the height-above-ground of the vehicle chassis. According to the invention this result is achieved in that the height-above-ground reference signal controlling the valve device for supplying and discharging hydraulic fluid to and from the hydraulic cylinders respectively is not constant but contains a signal component which is substantially proportional to the cosine of an angle at least approximately proportional to the angle of elevation of the vehicle chassis, that is the angle between the longitudinal axis of the chassis and the ground level.

If the elevation control signal controlling the two pumps and determining the angle of elevation of the chassis is generated by an electric signal generator which is of the same type as the signal generators coupled to the pivot levers of the support wheels and which is coupled to an angularly movable manual elevation control member, as for instance a control lever, and adapted to produce an elevation control signal representing the setting angle of said manual elevation control member, the angle of elevation of the vehicle chassis will be approximately proportional to the angular setting of said manual elevation control member, wherefore the signal generator coupled to this manual elevation control member can preferably be adapted to generate also an electric signal proportional to the cosine of the setting angle of the manual elevation control member to be used as the elevation responsive component of the height-above-ground reference signal.

BRIEF DESCRIPTION OF THE DRAWINGS

In the following the invention will be further described with reference to the accompanying drawings, which shows by way of example a track laying weapon carrier or tank according to the invention. In the drawings.

DESCRIPTION OF A PREFERRED EMBODIMENT

Figure 1:
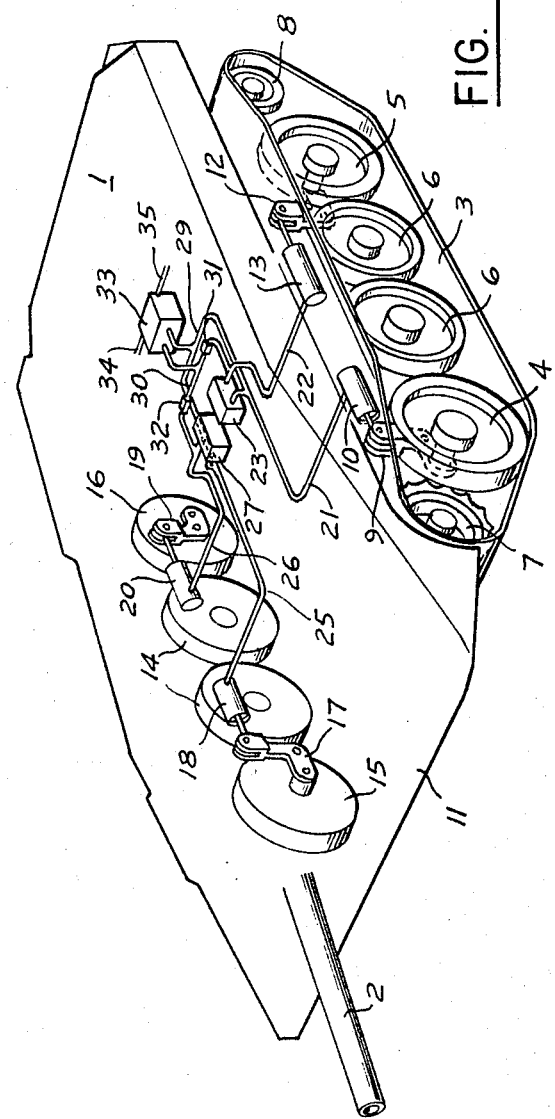
FIG. 1 shows the vehicle schematically and in perspective together with the components of the hydraulic system for controlling the movement of the support wheels that are of interest in connection with the invention.
Figure 2:
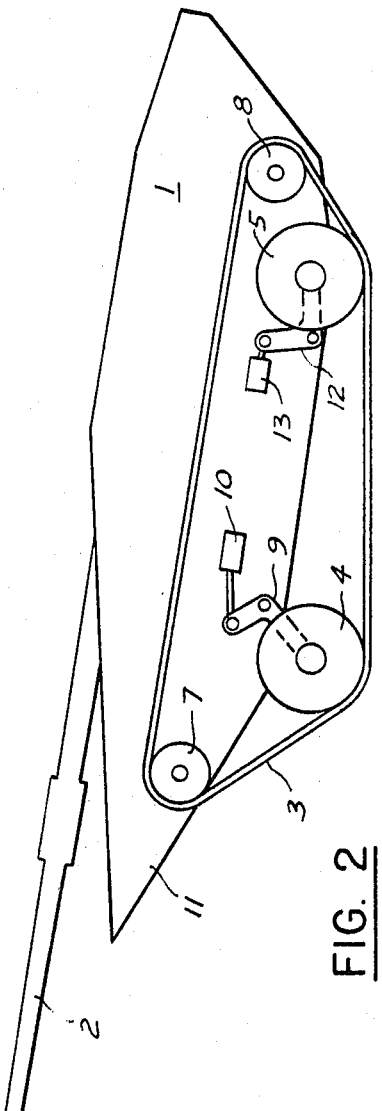
FIG. 2 is a schematic side view of the vehicle in elevated position.

The track-laying weapon carrier 1 shown in FIGS. 1 and 2 has a vehicle chassis 11 and a gun stationarily mounted on the chassis. Only the barrel 2 of the gun is schematically indicated in the drawing. The vehicle is provided with two identical driving tracks, wherefore only the left side track 3 is shown in detail in the drawing. This track 3 runs over a fore support wheel 4, a rear support wheel 5, two intermediate support wheels 6, a driving wheel 7 and a tension wheel 8. The driving wheel 7 and the tension wheel 8 serve also as guide wheels for the track 3 and are stationarily journalled in the chassis 11. The two intermediate support wheels 6 are resiliently mounted in the chassis and serve only to support part of the weight of the vehicle but have normally no influence upon the position of the vehicle chassis with reference to the ground. The position of the vehicle chassis with respect to the ground is determined by the positions of the fore support wheel 4 and the rear support wheel 5 with reference to the chassis. The fore support wheel 4 is journalled in a L-shaped lever 9 which is pivoted in the vehicle chassis and coupled to the piston in a hydraulic cylinder 10 through a piston rod. By means of this hydraulic cylinder 10 it is consequently possible to vary the angular position of the pivot lever 9 and thus the position of the fore support wheel 4 relative to the chassis 11. In the similar manner the rear support wheel 5 is journalled in an L-shaped pivot lever 12 which is coupled to the piston in a hydraulic cylinder 13.

The track on the right side of the vehicle (not shown in the drawing) runs in a similar way over a fore support wheel 15, a rear support wheel 16, two intermedicate support wheels 14 and two guide wheels (not shown in the drawing) stationarily journalled in the vehicle chassis and corresponding to the guide wheels 7 and 8 on the left side of the vehicle. The right fore support wheel 15 is journalled in an L-shaped pivot lever 17 which is coupled to the piston in a hydraulic cylinder 18, whereas the right rear support wheel 16 is in the similar manner journalled in an L-shaped pivot lever 19 coupled to the piston in a hydraulic cylinder 20.

Figure 3:
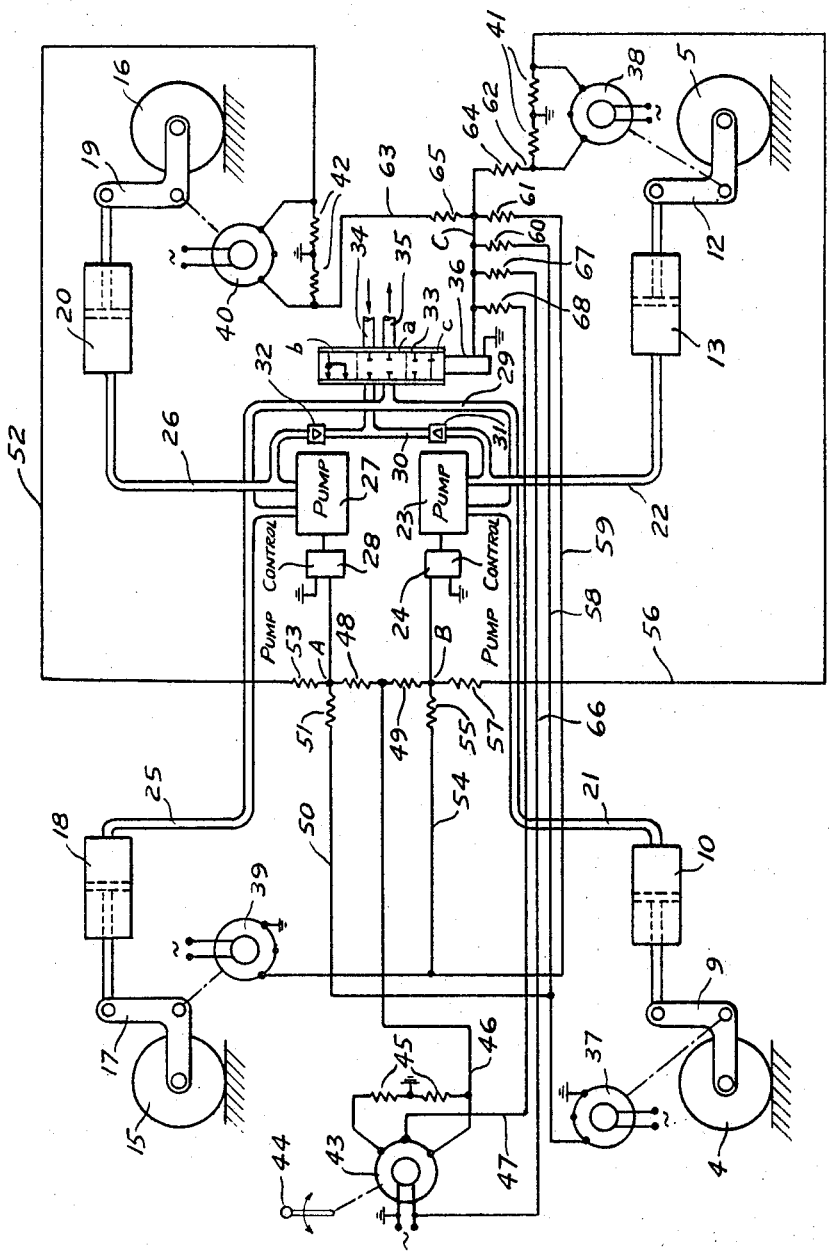
FIG. 3 is a diagram of the hydraulic system and the electric control system thereof, in which diagram hydraulic pipes are shown as double lines, electric leads are shown as single solid lines and mechanical transmission shafts are shown as dotted lines.

As most clearly shown in FIG. 3, the two hydraulic cylinders 10 and 13 on the left side of the vehicle are connected through hydraulic pipes 21 and 22 respectively to opposite sides of a controlled hydraulic fluid pump 23 with variable displacement, which is shown only schematically in the drawing. This pump can for example consist of a conventional axial piston pump having an adjustable swash plate. The pump 23 is provided with an electric control device 24 for controlling the displacement and the flow direction of the pump. In the similar manner the hydraulic cylinders 18 and 20 on the right side of the vehicle are connected through pipes 25 and 26 respectively connected to opposite sides of a controlled hydraulic pump 27 having variable displacement and provided with an electric control device 28. By means of these two pumps 23 and 27 it is consequently possible to transfer hydraulic fluid in either direction between the hydraulic cylinders 10 and 18 for the fore support wheels and the hydraulic cylinders 13 and 20 for the rear support wheels, whereby the vehicle chassis can be elevated or depressed with respect to the ground level.

The pipes 21 and 25 from the fore hydraulic cylinders 10 and 18 are directly interconnected with each other through a pipe 29. The pipes 22 and 26 from the rear hydraulic cylinders 13 and 20 are connected to a common pipe 30 through check valves 31 and 32 respectively. The pipes 29 and 30 are connected to a control valve 33 the opposite side of which is connected to a supply pipe 34 for hydraulic fluid from a hydraulic fluid source and a discharge pipe 35 for the hydraulic fluid. In the position of the valve 33 shown in the drawing and indicated by *a* the connection is interrupted between the pipes 29 and 30 on the one side of the valve and the supply pipe 34 and the discharge pipe 35 on the opposite side of the valve. When the valve 33 is set in the position indicated by *b*, the two pipes 29 and 30 are connected to the supply pipe 34 for hydraulic fluid. With the valve 33 set in the position indicated by *c* the connection between the pipe 30 and the supply pipe 34 is broken, whereas the pipe 29 communicates with the discharge pipe 35. By means of the control valve 33 it is consequently possible to supply hydraulic fluid to the hydraulic cylinders 10, 13, 18 and 20 or to withdraw hydraulic fluid from the cylinders, whereby the height-above-ground of the vehicle chassis can be varied. The control valve 33 is provided with an electric control device 36 for positioning the valve.

An electric control system is provided for the two fluid pumps 23 and 27 and the valve 33 and thus for the control of the elevation angle and the height-above-ground of the vehicle chassis. This control system comprises for each of the support wheels 4, 5, 15 and 16 a synchrogenerator transmitter 37, 38, 39 and 40 respectively having a rotor mechanically coupled to the pivot lever of the associated support wheel so as to be rotated with respect to the stator of the synchro-transmitter in agreement with the angular position of the pivot lever relative to the vehicle chassis. These synchro-generator transmitters are of the conventional type. The rotor windings of the synchro transmitters are connected to a constant alternating voltage. The output signals from the stator windings of the synchro transmitters will be proportional to the sine of the rotation angles of the transmitter rotors and thus of the associated pivot levers with reference to a predetermined starting or neutral position. In the synchro-transmitters 37 and 39 coupled to the pivot levers of the fore support wheels the one side of the stator winding is connected to ground, whereas the output signal from the transmitter is derived from the opposite side of the stator winding. In the synchro-transmitters 38 and 40 coupled to the pivot levers of the rear support wheels on the other hand the stator winding is connected to a voltage divider 41 and 42 respectively provided with a center tap connected to ground and two output signals are derived from the end terminals of this voltage divider. Each of these two synchro-transmitters 38 and 40 produces consequently two output signals, both being proportional to the sine of the rotation angle of the transmitter rotor and thus of the associated pivot lever with respect to a neutral position but having opposite polarities. Furthermore, the control system comprises a control signal synchro transmitter 43 of the same type as the synchro-transmitters described above. The rotor of this synchro-transmitter 43 is mechanically coupled to a manual elevation control lever 44. The rotor winding of this synchro-transmitter is supplied from the same constant alternating voltage as the rotor windings of the other synchro-transmitters. This control signal synchro-transmitter 43 produces two output signals. One of these output signals is derived from a voltage divider 45 connected across two of the three stator windings of the synchro-transmitter and having a center tap connected to ground. The second output signal from the synchro-transmitter is derived from the third stator winding of the transmitter. Consequently, the output signal to the lead 46 derived from the voltage divider 45 will be proportional to the sine of the rotational angle of the transmitter rotor and thus of the elevation control lever 44 with reference to a predetermined neutral or starting position, whereas the output signal on the lead 47 is proportional to the cosine of said rotational angle.

The output signal to the lead 46 from the control signal synchro transmitter 43 is connected to junction points A and B through resistors 48 and 49. The output signal from the synchro-transmitter 37 and one of the output signals from the synchro-transmitter 40 are also connected to the junction point A through a lead 50 and a resistor 51 and a lead 52 and a resistor 53 respectively. The signals to the leads 50 and 52 from the synchro transmitter 37 of the fore left support wheel 4 and from the synchro transmitter 40 of the rear right support wheel 15 respectively are connected to have opposite polarities when the pivot levers 9 and 19 respectively associated with said support wheels are positioned on the same side of a neutral or starting position in which the signals from the synchro-transmitters are zero. The voltage on the junction point A is supplied as a control signal to the control device 28 controlling the pump 27 connected to the hydraulic cylinders 18 and 20 on the right side of the vehicle.

In the same way the signal to the lead 46 from the control signal synchro-transmitter 43 is connected to the junction point B through the resistor 49, together with the output signal from the synchro-transmitter 39 connected to the junction point B through a lead 54 and a resistor 55, and the one output signal from the synchro-transmitter 38 connected to the junction point through a lead 56 and a resistor 57. Also in this case the signals on the conductors 54 and 56 are connected to have opposite polarities when the pivot lever 17 of the right fore support wheel 15 and the pivot lever of the rear left support wheel 5 are positioned on the same side of a neutral position in which the signals from the synchro-transmitters 39 and 38 are zero. The signal on the junction point B is supplied as a control signal to the control device 24 controlling the pump 23 connected to the hydraulic cylinders 10 and 13 on the left side of the vehicle.

In response to the control signals from the junction points A and B the pumps 27 and 23 will obviously transfer hydraulic fluid between the hydraulic cylinders 10 and 18 of the fore support wheels on the one hand and the hydraulic cylinders 13 and 20 of the rear support wheels on the other hand in such a way that the following equations are satisfied:

$$K_1 \sin \gamma = \sin (\beta_{2h} - \beta_0) - \sin (\beta_{1v} - \beta_0) \quad (1)$$
$$K_1 \sin \gamma = \sin (\beta_{2v} - \beta_0) - \sin (\beta_{1h} - \beta_0) \quad (2)$$

In these equations $\gamma$ is the rotational angle of the rotor of the control signal synchro-transmitter 43 and thus of the elevation control lever 44 from the neutral position in which the signal on the lead 46 is zero; $\beta_{1v}$ is the angle between the pivot lever 9 of the fore left support wheel 4 and the plane in the vehicle chassis containing the pivot axes of all pivot levers; $\beta_{1h}$ is the corresponding angle for the pivot lever 17 of the right fore wheel 15; $\beta_{2v}$ is the corresponding angle for the pivot lever 12 of the left rear wheel 5; $\beta_{2h}$ is the corresponding angle for the pivot lever 19 of the right rear wheel 16; $\beta_0$ is the angle of the pivot levers with reference to said plane in the vehicle chassis when said plane is parallel to the ground level and the signals from all synchro-transmitters 37, 38, 39 and 40 are zero; and $K_1$ is a constant. For the equations given above it has also been assumed that the rotational angles of the pivot levers $\beta_{1v}$, $\beta_{1h}$, $\beta_{2v}$, $\beta_{2h}$ and $\beta_0$ have negative values when the pivot levers are rotated below said plane in the vehicle chassis.

It is obvious that due to this control of the two pumps 23 and 27 the vehicle chassis is automatically given and kept in an angle of elevation or depression respectively, that is an angle between said plane in the vehicle chassis and the ground level, which is controlled by the setting angle $\gamma$ of the elevation control lever 44. The value of the constant $K_1$ is controlled by the values of the voltage dividers 41, 42 and 45 and of the resistors 48, 49, 51, 53, 55 and 57.

The output signals from the synchro-transmitters 37 and 39 on the pivot levers 9 and 17 of the fore support wheels 4 and 15 respectively are also fed to a junction point C through leads 58 and 59 and resistors 60 and 61 respectively. The second output signal from the synchro-transmitters 38 and 40 on the pivot levers 12 and 19 of the rear support wheels 5 and 16 is fed to the junction point C through leads 62 and 63 and resistors 64 and 65 respectively. Accordingly, the junction point C receives a constant signal supplied to the junction point through a lead 66 and a resistor 67 from the supply voltage connected to the rotor winding of the control signal synchro-transmitter 43. Furthermore, the signal on the lead 47 which is proportional to the cosine of the angle $\gamma$ of the elevation control lever 44 with respect to the neutral position of this lever is fed to the junction point C through a resistor 68. The signals from the synchro-transmitters 37 to 40 on the leads 58, 59, 62 and 63 respectively are connected so as to have the same polarity when the pivot levers are on the same side of the neutral positions corresponding to the angle $\beta_0$. At first it will also be assumed that the constant signal to the lead 66 has the opposite polarity of the signals from the synchro-transmitters 37 to 40, when the pivot levers are rotated below their neutral positions, whereas the signal to the lead 47 is assumed to have the same polarity as the signals from the synchro-transmitters 37 to 40, when the pivot levers are rotated below their neutral positions. The signal at the junction point C is supplied as a control signal to the control device 36 for the valve 33 supplying and discharging hydraulic fluid to and from the hydraulic cylinders respectively.

If at first the effect of the signal proportional to $\cos \gamma$ on the lead 47 is neglected, it is obvious that the control device 36 will in response to the control signal from the junction point C control the valve 33 in such a way that the following equation is always satisfied:

$$-K_2 = \sin(\beta_{1v}-\beta_0) + \sin(\beta_{1h}-\beta_0) + \sin(\beta_{2v}-\beta_0) + \sin(\beta_{2h}-\beta_0) \quad (3)$$

where $K_2$ is a constant. This equation shows that the mean height-above-ground of the vehicle chassis will automatically be maintained constant and independent of the angle of elevation of the vehicle chassis at a value determined by the constant $K_2$, the magnitude of which is determined by the dimensions of the voltage dividers 41 and 42 and of the resistors 60, 61, 62, 65 and 67 and of the transformation ratios in the synchro-transmitters.

Figure 4:
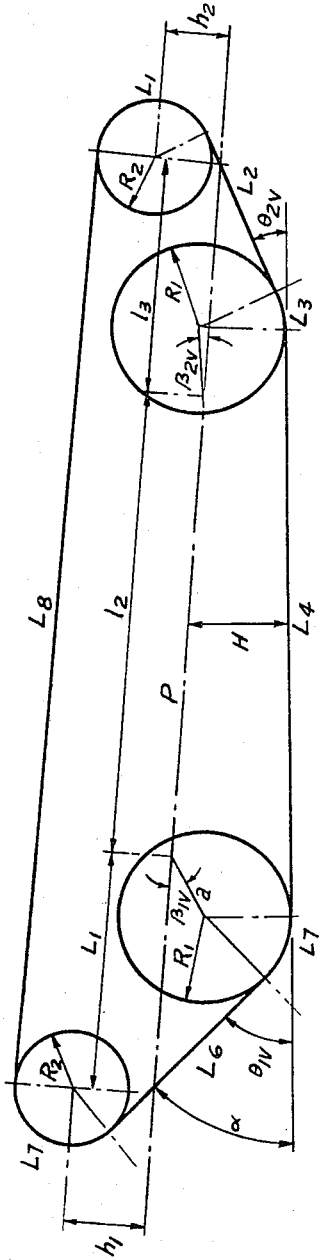
FIG. 4 illustrates schematically the geometry of a track and the associated guide and support wheels of the vehicle.

As already discussed, the total necessary length of each track in a system of the type previously described is dependent on the elevation angle of the vehicle chassis as well as of the height-above-ground of the chassis. The relationship between these quantities can be deduced from FIG. 4 which shows schematically the geometry of the track and the track wheels on the left side of the vehicle. In FIG. 4 the plane including the pivot axes of the pivot levers for the four support wheels is designated with P and the elevation angle of the chassis, that is the angle between the plane P and the ground level, designated with $\alpha$. The average height-above-ground of the vehicle chassis is designated with H. Using these designations and the designations defined in the foregoing and the other designations given in FIG. 4 and assuming that the pivot lever angles $\beta_{1v}$ and $\beta_{2v}$ have negative values, when the pivot levers are rotated below the plane P, the following expression is obtained for the total length L of the track:

$$L = 2\pi R_2 + (R_1-R_2)(\theta_{1v}+\theta_{2v}) + L_2 + L_4 + L_6 + L_9 \quad (4)$$

where $$L_2 = \frac{1}{\cos(\theta_{2v}+\alpha)}[l_3 - a\cos\beta_{2v} - (R_1-R_2)\sin(\theta_{2v}+\alpha)] \quad (5)$$

$$L_4 = l_2 \cos\alpha + a\cos(\beta_{1v}+\alpha) + a\cos(\beta_{2v}-\alpha) \quad (6)$$

$$L_6 = \frac{1}{\cos(\theta_{1v}-\alpha)}[l_1 - \cos\beta_{1v} - (R_1-R_2)\sin(\theta_{1v}-\alpha)] \quad (7)$$

$$L_8 = \text{constant} \quad (8)$$

$$\theta_{1v} = \alpha + \text{arc tan} \frac{h_1 - a\sin\beta_{1v}}{l_1 - a\cos\beta_{1v}} + \text{arc tan} \frac{R_1-R_2}{l_1-a\cos\beta_{1v}} \quad (9)$$

$$\theta_{2v} = \alpha + \text{arc tan} \frac{h_2 - a\sin\beta_{2v}}{l_3 - a\cos\beta_{2v}} + \text{arc tan} \frac{R_1-R_2}{l_3-a\cos\beta_{2v}} \quad (10)$$

Further one has the relations:

$$\alpha = \text{arc tan} \frac{\sin\beta_{2v} - \sin\beta_{1v}}{\cos\beta_{1v}+\cos\beta_{2v}+\frac{l_2}{a}} \quad (11)$$

$$H = R_1 - a\sin(\beta_{1v}+\alpha) - \frac{l_2}{a}\sin\alpha \quad (12)$$

Figure 5:
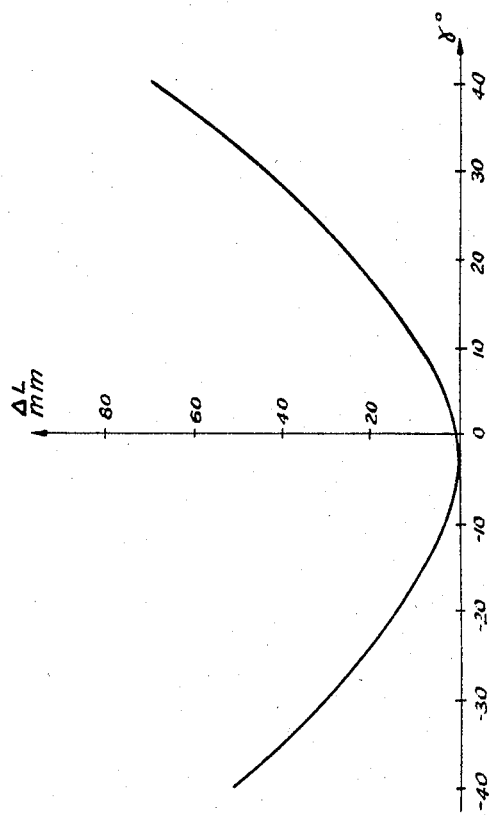
FIG. 5 is a diagram illustrating the variation of the total necessary track length as a function of the setting angle of the manual elevation control member for a constant mean height-above-ground of the vehicle chassis.

By solving the equation system formed by the Equations 1 to 11 it is possible to express the total track length L as a function of the setting angle $\gamma$ of the elevation control lever 44 for a constant mean height-above-ground H of the vehicle chassis. The reduction of this equation system is comparatively laborious and the expression obtained for said function will be rather complicated. By using a computer, however, it is possible to calculate the function and FIG. 5 is a diagram of the variation $\Delta L$ of the track length as function of the setting angle $\gamma$ of the elevation control lever for the following values of the constants in the equation system:

$a = 330$ mm.     $R_1 = 400$ mm.
$l_1 = 1150$ mm.     $R_2 = 270$ mm.
$l_2 = 2210$ mm.     $K_1 = 2,409$
$l_3 = 1150$ mm.     $K_2 = 0$
$h_1 = 390$ mm.     $\beta_0 = -2,25°$
$h_2 = 335$ mm.

From this diagram it can be seen that the relationship between the variational $\Delta L$ of the track length and the setting angle $\gamma$ of the elevation control lever 44 corresponds closely to a cosine function. Certainly the diagram in FIG. 5 is not symmetrical about the value $\gamma=0$, the reason for this being that in the chosen example the track arrangement is not completely symmetrical, as the quantity $h_1$ has not the same value as the quantity $h_2$. If these quantities have the same value so that the track arrangement is completely symmetrical, the track will have its minimum length for $\gamma=0$, that is when the vehicle chassis has the elevation angle $\alpha=0$. As the elevation angle $\alpha$ of the vehicle chassis is substantially linearly proportional to the setting angle $\gamma$ of the elevational control lever 44, the length of the track will also vary as cosine of the elevation angle $\alpha$ of the vehicle chassis.

By using also the Equation 12 given above together with the other equations it is also possible to express the length L of the track as a function of the mean height-above-ground H of the vehicle chassis for a constant value of the elevation angle $\alpha$ of the vehicle chassis. If this function is also calculated by means of a computer, one finds that the total length L of the track varies substantially linearly with the height-above-ground H of the vehicle chassis, when the elevation angle $\alpha$ of the chassis is kept constant.

From this it is clear that it is possible to keep the track length and thus the tension in the track substantially constant and independent of the elevation angle $\alpha$ of the chassis, if upon variation of the elevation angle $\alpha$ of the chassis also the mean height-above-ground H of the chassis is changed by an amount proportional to the cosine of the elevation angle $\alpha$ or of the setting angle $\gamma$ of the elevation control lever 44.

In the embodiment of the present invention shown in FIG. 3 this is achieved by supplying the signal on the lead 47, which is produced by the control signal synchro transmitter 43 and is proportional to the cosine of the setting angle $\gamma$ of the elevation control lever 44, to the junction point C through the resistor 68, whereby this signal will take part in the control of the valve 33 supplying and discharging hydraulic fluid to and from the hydraulic cylinders respectively. It is obvious that if the effect of this additional control signal component for the valve 33 is also taken into consideration, the valve 33 will automatically control the supply and the discharge of hydraulic fluid to and from the hydraulic cylinders respectively in such a way that the following equation is always satisfied:

$$K_3 \cos(\gamma+\epsilon) - K_2 = \sin(\beta_{1v}-\beta_0) + \sin(\beta_{1h}-\beta_0) + \sin(\beta_{2v}-\beta_0) + \sin(\beta_{2h}-\beta_0) \quad (13)$$

In this expression $K_3$ and $\epsilon$ are constants. The constant $\epsilon$ is necessary as it has been assumed that the track arrangement is not completely symmetrical, wherefore the diagram in FIG. 5 is not symmetrical about the value $\gamma=0$. This Equation 13 replaces consequently the Equation 3 in the equation system previously discussed. If from the new equation system containing the Equation 13 the length L of the track is expressed as a function of the setting angle $\gamma$ of the elevation control lever 44 and this function is calculated by means of a computer with following values of those constants in the system that are easily variable nad with the previously assumed values of the remaining constants in the system one obtains the relationship between the variation $\Delta L$ of the track length and the setting angle $\gamma$ of the elevation lever 44 illustrated by the diagram in FIG. 6.

$\beta_0 = 3,5°$
$\epsilon = 6,6°$
$K_1 = 2,4112$
$K_2 = -2,086$
$K_3 = -2,384$

The negative values of the two constants $K_2$ and $K_3$ indicate only that the signals on the leads 47 and 66 have polarities opposite to those previously assumed for these signals.

Figure 6:
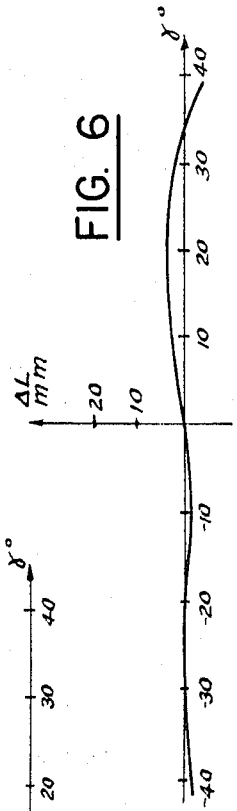
FIG. 6 is a diagram of the same function relationship when using the present invention, whereby the height-above-ground of the vehicle chassis is varied in response to the elevation angle of the chassis.

As can be seen from FIG. 6 the length of the track and thus the tension in the track will in this case vary only insignificantly upon variation of the elevation of the vehicle chassis, and the invention provides consequently a simple, inexpensive and reliable solution of the given problem.

We claim:
1. A track-laying vehicle having a chassis with a wheel supported track on each side, said vehicle comprising in combination:
   a pair of front support wheels and a pair of rear support wheels for the tracks;
   a linkage coupled to each of said wheels and pivotally linked to the chassis for up and down movement of the wheels in reference thereto;
   a hydraulic cylinder-piston unit for each of said linkages, the piston of each of said units being coupled to one of said linkages to control the angular position of the respective linkage and thus the spatial position of the respective wheel with respect to the chassis by the position of the piston in its cylinder;
   a signal generator connected to each of said linkages for generating signals in accordance with the angular position of the respective linkage with reference to the chassis;
   a first reversible fluid pump for one of the front wheels and the corresponding rear wheel and a second reversible fluid pump for the other front wheel and the corresponding other rear wheel;
   first conduits connecting the hydraulic units coupled to the linkages of said one front wheel and said corresponding rear wheel to opposite sides of the first pump, and second conduits connecting the hydraulic units coupled to the linkages of said other front wheel and said other corresponding rear wheel to opposite sides of the second pump for pumping pressure fluid to and discharging from said hydraulic units;
   a fluid control valve means connected to a supply of pressure fluid and to at least one hydraulic unit on opposite sides of the chassis and to both pumps for controlling the fluid flow to and from said unit;
   manually operable chassis elevational control means for generating chassis-height-above-ground reference signals, said signals including a component at least approximately proportional to the cosine of an angle which is substantially proportional to the angle of elevation of the chassis as defined by the longitudinal mid-axis of the chassis and the ground level; and
   signal comparing circuit means comparing said reference signals and the sum of all signals generated by said signal generators, the differential of said signals controlling said control valve means.

2. The vehicle according to claim 1 wherein said manual control means comprise an elevation signal generator, a pivotally mounted manually tiltable control member coupled to said signal generator and controlling the same to generate a first elevation control signal representing the angular setting of said control member, and a second signal approximately proportional to the cosine of the said angle of said member, said second signal constituting said signal component in said reference signals.

3. The vehicle according to claim 2 wherein said signal generators coupled to said linkages generate signals proportional to the sine of the angular positions of said linkages relative to the longitudinal mid-axis of the chassis.

4. The vehicle according to claim 3 wherein said elevation signal generator is a trigonometric-function generator for generating a first signal proportional to the set angle of said elevation control member, and a second signal proportional to the cosine of said angle, said first signal constituting said elevation control signal and said second signal constituting said component in the height-above-ground reference signal.

5. The vehicle according to claim 4 wherein said signal generators coupled to said linkages and said elevational signal generator are synchro-generator transmitters, each of said transmitters having two stator windings and a rotor and the elevational signal generator having a third stator winding, the angular positions of the rotor of the generators coupled to the linkages being each controlled by the angular position of the respective linkage and the angular position of the rotor of the elevational signal generator being controlled by the angular position of said tiltable control member, the signal output of the signal generators coupled to the linkages being taken out of the stator windings of said generators, the elevation control signals being taken out at said two stator windings of the elevation signal generator, and said component in the height-above-ground reference signal being taken out at the third stator winding of said generator.

References Cited

UNITED STATES PATENTS 3,351,150  11/1967  Henstrom.

BENJAMIN A. BORCHELT, Primary Examiner

STEPHEN C. BENTLEY, Assistant Examiner

U.S. Cl. X.R.

180—9.2